Jan. 30, 1968  HISAO MORIYAMA ET AL  3,366,437
ZOOM LENS HAVING TWO MOVABLE NEGATIVE LENS MEMBERS
DISPOSED BETWEEN TWO POSITIVE LENS MEMBERS
Filed March 16, 1964  4 Sheets-Sheet 1 f = 7.5mm

SPHERICAL ABERRATION & DEVIATION FROM SINE CONDITION f = 16.6mm

SPHERICAL ABERRATION & DEVIATION FROM SINE CONDITION f = 30mm

SPHERICAL ABERRATION & DEVIATION FROM SINE CONDITION f = 7.5mm

ASTIGMATISM f = 16.6mm

ASTIGMATISM f = 30mm

ASTIGMATISM f = 7.5mm

DISTORTION OF IMAGE f = 16.6mm

DISTORTION OF IMAGE f = 30mm

DISTORTION OF IMAGE

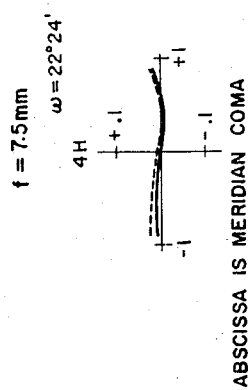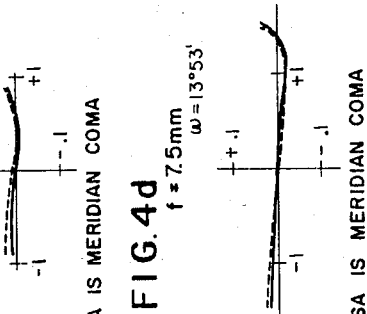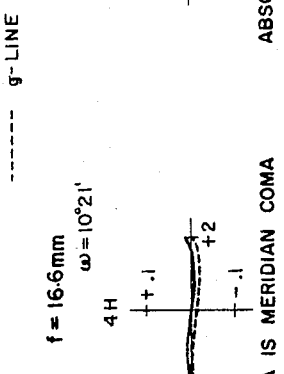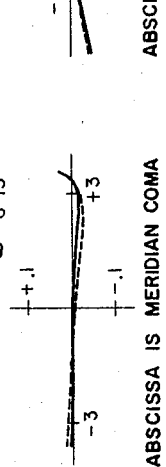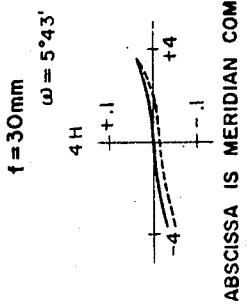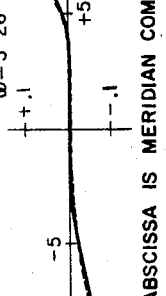

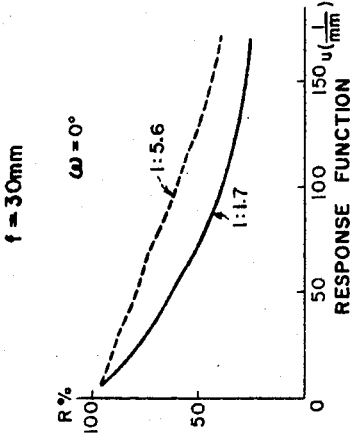
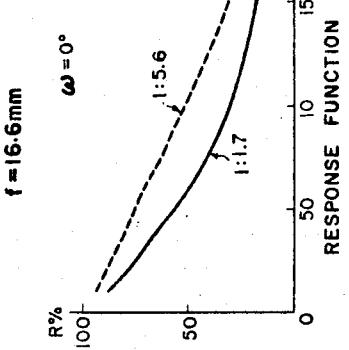
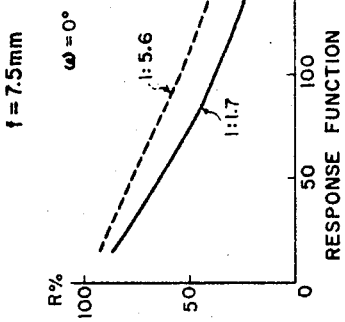
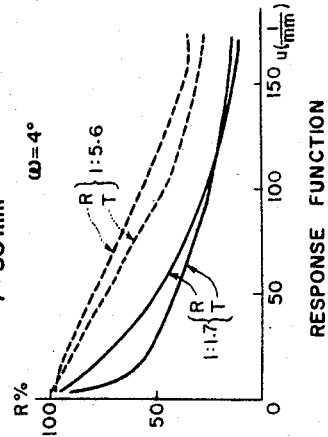
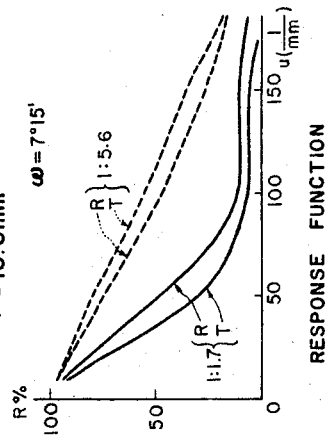
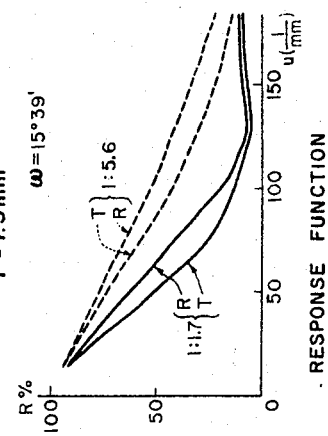

United States Patent Office 3,366,437
Patented Jan. 30, 1968

3,366,437
ZOOM LENS HAVING TWO MOVABLE NEGATIVE LENS MEMBERS DISPOSED BETWEEN TWO POSITIVE LENS MEMBERS
Hisao Moriyama and Akio Ito, Suwa, Nagano, Japan, assignors to Sankyo Kigaku Kogyo Kabushiki-Kaisha, Suwa, Japan
Filed Mar. 16, 1964, Ser. No. 352,249
Claims priority, application Japan, Mar. 23, 1963, 38/15,180
3 Claims. (Cl. 350—186)

ABSTRACT OF THE DISCLOSURE

A zoom lens system comprising a front positive lens member, a rear positive lens member and a pair of movable negative lens members between the front and rear lens members effecting zooming movement of the known type. In order to make the lens system small-sized and wide-angle, the relationship between the focal lengths of the front lens member, the two zooming lens members and the rear lens member has been determined. The lens system composed of individual lens elements whose parameters are listed in the table, has a maximum relative aperture of $f/1.7$ and a ratio of maximum to minimum focal length of 4 with the minimum focal length of 7.5 mm. at which the semiangular field is 22°23′30″.

---

This invention relates to a photographic objective of the "zoom" type, that is, the type in which the focal length thereof can be continuously varied throughout a range while maintaining constant position of the image plane whereby the scale of the image or magnification can be varied.

Zoom type optical systems are generally required (1) to have a small size while maintaining a large ratio of maximum to minimum focal length, (2) to make the minimum focal length shorter so as to widen the angle of vision or the angular field, (3) to be well corrected for aberrations throughout the zooming range with the variation in correction being small, and so on. However, the requirement that the optical system have a small size calls for the presence of conditions inconsistent with those necessary for the requirement that it have a large ratio of maximum to minimum focal length. Also the requirement for a decreased minimum focal length tends to increase the effective diameter of the front lens member, which is inconsistent with the requirement that the system be small in size.

Accordingly, the lens systems of continuous zoom type according to the abovementioned arrangement can have only a minimum focal length of at most 10 mm. provided that the ratio of maximum to minimum focal length thereof is on the order of 4, and it cannot sufficiently meet all the requirements as previously described.

The present invention overcomes the abovementioned difficulties from the standpoint of design and thereby has provided lens systems of zoom type having a very small size and such that they have an overall length of 48.48 mm., a maximum lens diameter of 33 mm., a maximum lens displacement of 3.55 mm. for the third lens member with a relative aperture of 1:1.7, and a minimum focal length of 7.5 mm. while the ratio of maximum to minimum focal length is maintained as high as 4.

The invention will become more readily apparent from the following detailed description taken in conjunction with the accompanying drawings in which.

Figure 1:
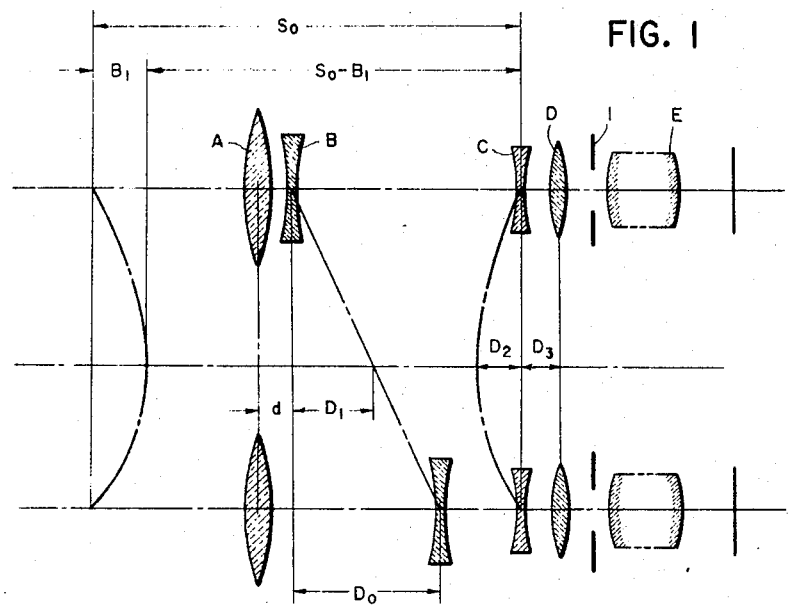
FIG. 1 is a schematic diagram illustrating the principle of the invention with the upper row illustrating the relative positions of the respective members of the optical system at the minimum focal length of the system while the lower row illustrates the positions at the maximum focal length.

FIGS. 4a–4i are curves illustrating various meridian comas for the d- and g-line of the spectrum at various values of the focal length, FIGS. 4a–4c corresponding to the maximum value of the angular field, FIGS. 4d–4f to 60% of the maximum value, and FIGS. 4g–4i corresponding to the central portion of the angular field; and FIGS. 5a–5f are curves illustrating a response function serving to collectively estimate the extent to which the various aberrations have been corrected, at a minimum, an intermediate and a maximum value of the focal length, FIGS. 5a–5c corresponding to images focussed on the optical axis, and FIGS. 5d–5f corresponding to an image at 70% of the maximum value of the angular field, the solid lines representing the case of a maximum relative aperture of $f/1.7$ while the dotted lines represent the case of a relative aperture of $f/5.6$, reference character R corresponding to the sagittal astigmatism and the reference character T corresponding to the meridian astigmatism shown in FIG. 3.

Referring now to FIG. 1 of the drawings, there is illustrated a simplified optical system for the purpose of describing the principle of the invention. The optical system illustrated comprises a front member A having a positive dioptric power and movable in opposite directions along the optical axis of the system within a narrow range for the focussing purposes only, a first movable member B having a negative dioptric power and linearly movable only toward the image plane of the system along the optical axis in order to vary the magnification of the system from its lower limit to its upper limit, a second movable member C having a negative dioptric power and first movable along the optical axis toward an object to be photographed and then back to its original position in order to vary the magnification of the system from its lower limit to its upper limit, a stationary member D having a positive dioptric power and fixedly disposed to the rear of the second movable member C, and a stationary relaying member E having a positive dioptric power and serving to provide the power to focus the collimated light coming from the afocal portion to maintain the position of the image plane of the system constant during zooming movement.

The front member A of the optical system or photographic objective is irrelevant to the zooming operation and is required only to be slightly movable in the opposite directions along the optical axis of the objective when an object to be photographed, positioned at any finite distance from the objective is desired to be focussed onto the image plane of the objective. Thus the front member A may be considered to be a member which is substantially immovable as far as a zooming optical system is concerned. The movable members B and C are movable between the stationary members A and D. This permits a casing for the objective to be reasonably designed and also any auxiliary optical system to be conveniently combined with the objective.

As shown in FIG. 1, an iris diaphragm I of a conventional design can be disposed between the final member D of the zooming system and the relaying member E. If desired, the diaphragm can be disposed within the member E. It is noted that the aperture of the iris diaphragm need not be varied in accordance with the zooming movement or a magnitude of the magnification.

In order to describe the principle of the invention, it is assumed that an object to be photographed is positioned at a finite distance on the optical axis of the objective and on the lefthand end thereof as viewed in FIG. 1. Under this assumed condition, a second resultant focus of the combined members A and B depicts generally a locus represented by a quadratic equation involving a variable denoting a displacement $B_1$ of the center of the member B (see FIG. 1) from the reference point at which the center of the member B is positioned at the minimum focal length of the system, during zooming movement. If the dioptric powers of both members A and B are selected such that the second resultant focus of the combined members B at the beginning of the zooming movement is positioned at the same point on the optical axis of the system as at the end of such movement then the zooming movement causes that focus to depict a locus $B_1$ (see FIG. 1) represented by the equation $$B_1 = \frac{D_1(D_0-D_1)(M-1)}{MD_0-(M-1)D_1}$$

where M represents a ratio of variation in magnification, i.e., the ratio of the maximum to the minimum focal length of the objective, $D_0$ the total displacement of the member B during the zooming movement, and $D_1$ represents a displacement of the member B when the displacement $B_1$ is at its maximum value. Thus it will be seen that $D_1 \leq D_0$.

Displacement of the member C should be determined upon the basis of the locus $B_1$ just described. It will be understood that an afocal zooming system is provided by the linear reciprocating movement of the member C corresponding to the linear movement of the member B in one direction.

A locus $D_2$ due to the displacement of the member C as shown in FIG. 1 may be represented by the equation $$D_2 = \frac{H \pm \sqrt{H^2-4\{(S_0-B_1)F_C+(F_D-D_3)(S_0-B_1-F_C)\}}}{2}$$

where $F_C$ and $F_D$ represent focal lengths of the members, C and D respectively, $S_0$ is a distance along the optical axis between the second resultant focus of the combined members A and B at either end of the zooming movement and the center of the member C, and $D_3$ represents the spacing along the optical axis between the centers of the members C and D.

Further $$H = F_D + S_0 - B_1 - D_3$$
$$F_C < O$$
$$F_D > O$$
$$|F_C| > F_D$$
$$D_3 \ll F_D$$

and $$D_3 \ll |F_C|$$

Figure 2:
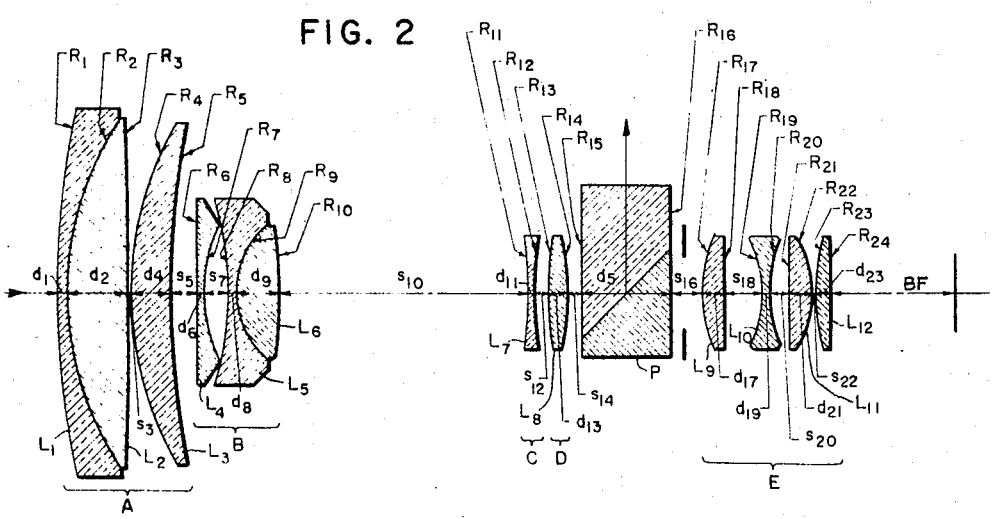
FIG. 2 is a longitudinal sectional view of a photographic objective embodying the teachings of the invention and illustrated at the minimum focal length thereof.

The principle of the invention thus far described in conjunction with FIG. 1 can be realized in the form of a photographic objective illustrated in FIG. 2 wherein like reference characters designate the components corresponding to those shown in FIG. 1. The arrangement illustrated comprises a front lens member A consisting of a cemented doublet component $L_1$, $L_2$ having a positive dioptric power and followed by a single lens component $L_3$ having also a positive dioptric power with an air gap $S_3$ between the doublet $L_1$, $L_2$ and component $L_3$. The doublet component includes a negative meniscus lens element $L_1$ having its convex surface $R_1$ facing an object to be photographed and a doubly convex lens element $L_2$ cemented to the meniscus element. The material of the meniscus element $L_1$ has a higher refractive index than the doubly convex element $L_2$ and the difference between the refractive indices is less than 0.1 and it has a smaller Abbé number than that of the element $L_2$, the difference between the Abbé numbers being equal to or higher than 10. The single lens element $L_3$ is a positive meniscus element having its convex surface $R_4$ facing the object and its rear surface $R_5$ shown in this example as a convex surface facing the image and having a large radius of curvature. However, if its radius of curvature is equal to or greater than five times the focal length of the front member A, the surface $R_5$ may be either convex or concave.

The movable lens member B includes, as a front component, a single component $L_4$ having a negative dioptric power followed by a negative, cemented doublet component $L_5$, $L_6$ with an air gap $s_7$ between component $L_4$ and doublet $L_5$, $L_6$. In FIG. 2 it is noted that the movable member B is shown in a position in which the same is close to the front member A and which corresponds to the minimum focal length of the objective. In the example illustrated, the single component $L_4$ has a convex surface facing the object and a large radius of curvature $R_6$. However, if the radius of curvature $R_6$ is equal to or greater than five times the focal length of the movable member B then the abovementioned surface may be either convex or concave. The single component $L_4$ has its rear concave surface facing the image.

The doublet component $L_5$, $L_6$ disposed behind the component $L_4$ includes a negative, doubly concave element $L_5$ and a positive element $L_6$ cemented to each other on a common surface having a small radius of curvature $R_9$. The material of the element $L_5$ has a higher refractive index than the element $L_6$ and it is of more importance that the material of the element $L_5$ have an Abbé number higher than that of the element $L_6$. Further the element $L_5$ has a front concave surface having a radius of curvature $R_8$ and facing the object and a rear concave surface having a radius of curvature $R_9$ and facing the image.

It has been found that the rear concave surface of the element $L_5$ exhibits a distinctive effect upon the compensation for chromatic aberration along the optical axis of a zooming system. The radius of curvature $R_9$ should be selected to be within a relatively narrow range of from more than 0.15 times to less than 0.3 times the focal length of the cemented doublet element $L_5$, $L_6$. In the example illustrated, the element $L_6$ is shown as having its rear surface concave toward the image and having a large radius of curvature $R_{10}$. However, that rear surface may be either convex or concave provided that its radius of curvature $R_{10}$ is equal to or greater than three times the focal length of the doublet component $L_5$, $L_6$, which, in turn, is chosen so as to be greater than twice the focal length of the movable member B but less than 0.4 times the same.

As shown in FIG. 2, the arrangement includes a second movable member C composed of a single component having a negative dioptric power. The single component C may have its opposed concave surfaces equal in radius of curvature (see Table I as will be described hereinafter). Alternatively, it may be a meniscus component having its front convex surface having a large radius of curvature $R_{11}$ and its rear concave surface (see Table II as will be described hereinafter).

As previously described, the movable member C can effect reciprocating movement to vary the magnification provided by the objective. In addition, it cooperates with a stationary member D as will be subsequently described to correct the spherical aberration throughout a range of variation. Therefore the front and rear surfaces of the member C are determined in accordance with the parameters of the stationary member D. However, the configuration of these surfaces is not particularly subject to limitation. The member C has its positive dioptric power laying within limits which will be described hereinafter.

The stationary member D is composed of a single component having a positive dioptric power and forms the final lens element of the afocal zooming system. The single component D may be either doubly convex or plano-convex and has front and rear surfaces of any desired shape.

The stationary member D cooperates with the movable member C to correct both the spherical aberration and astigmatism. Thus, if the front and rear surfaces of the movable member C have the radius of curvature varied then the spherical aberration and astigmatism will be varied in the opposite directions. In other words, any over-correction for the spherical aberration is accompanied by a deviation of the astigmatism toward its negative side while any under-correction of the spherical aberration is accompanied by a deviation of the astigmatism toward its positive side. On the other hand, the shape of the movable member C does not greatly affect the variation in astigmatism. Thus the utilization of the relationship just described permits aberrations to be reasonably corrected.

The focal length of the movable member C has its absolute value greater than the focal length of the stationary member D and an air gap $S_{12}$ between the members C and D is sufficiently smaller than the absolute value of the focal length of each member C or D.

The air gap $S_{12}$ between both members C and D at one of the limits of the zooming range has the same minimum magnitude as at the other limit thereof. During the zooming movement, the air gap $S_{12}$ is first increased from its minimum value, until it reaches a maximum value at a certain intermediate position during that movement. Thereafter the air gap is decreased to its minimum value. From FIG. 1 it will be appreciated that, when the air gap $S_{12}$ is at its maximum value, that a locus for the second focus of the combined members A and B has its maximum amplitude (see FIG. 1). Such locus has been previously described in conjunction with FIG. 1.

The resulant focal length $F_{C,D}$ of the members C and D is always positive during the variation of the air gap $S_{12}$ as above described and is varied in such a manner that the increase in the air gap $S_{12}$ is accompanied by a decrease in the resultant focal length $F_{C,D}$ and that when the air gap reaches its maximum the focal length is at its minimum value. The minimum value $F_{C,D \, min}$ of the resultant focal length of the combined members C and D is chosen so as to be greater than the magnitude of the focal length $F_D$ of the stationary member D.

The relationship between the focal lengths of the respective members A, B, C and D constituting the zooming system will now be described. The absolute value of the focal length $F_B$ of the movable member B is greater than 0.2 times the focal length $F_A$ of the member A but less than 0.4 times the same. Also the absolute value of the focal length $F_C$ of the movable member C is greater than 2.5 times the focal length $F_B$ of the movable member C but less than 3 times the same.

Also the total length of the afocal zooming system or the axial distance D afocal between the apex of the front surface of the front member A and the apex of the rear surface of the element $L_8$ is greater than 0.8 times the focal length $F_A$ of the front member A but less than 1.3 times the same.

A stationary member E used as a relaying lens is disposed in rear of the zooming system as above described with both optical axes aligned, and is shown in FIG. 2 as including a composite member consisting of four elements. If desired, the stationary member E may be a single element. However, the member E has a positive dioptric power. The stationary member F includes a plano-convex element $L_9$ and a doubly convex element $L_{11}$ disposed behind the element $L_9$ with an air gap $S_{20}$ therebetween. Further a doubly convex element $L_{12}$ is associated with the element $L_{11}$ behind the same with an air gap $S_{22}$ therebetween. The relaying element E has its focal length $F_E$ satisfying the following inequality $$\sqrt{M-1} \cdot F_S < F_E < \sqrt{M+1} \cdot F_S$$

where $F_S$ designates the minimum focal length obtainable during the zooming movement and M represents a ratio of variation in magnification or a ratio of the maximum to the minimum focal length of the objective.

Numerical data for the embodiment as above described in conjunction of FIG. 2 are given in the following tables, in which $R_1$, $R_2$ . . . designate the radii of curvature of the individual surfaces of the objective counting from the front, the positive sign indicating that the surface is convex to an object to be photographed and the negative sign indicating that it is concave thereto, $D_1$, $D_2$ . . . designate the axial thickness of the individual elements of the objective, and $S_1$, $S_2$ . . . designate the axial air separations between the components of the objection. The tables also give refractive indices $n_d$ for the $d$-line of the spectrum and the Abbé numbers $\nu$ of the materials from which the various elements of the objective are made.

The second section of each table gives the values of the three variable axial air separations between the four components of the objective for three representative positions which correspond to the minimum, intermediate and the maximum values $F_{min.}$, $F_{inter}$ and $F_{max.}$ respectively of the complete objective, the latter values also being given.

The dimensions in each table are given in terms of millimeters.

TABLE I

| Radius | Thickness or Air Separation | Refractive Index, $n_d$ | Abbé Number, $\nu$ |
|---|---|---|---|
| $R_1 = +90.30$ | $d_1 = 1.0$ | 1.6990 | 30.1 |
| $R_2 = +28.76$ | $d_2 = 5.9$ | 1.6073 | 59.5 |
| $R_3 = -762.36$ | $s_3 = 0.1$ | | |
| $R_4 = +30.68$ | $d_4 = 4.1$ | 1.6204 | 60.3 |
| $R_5 = +112.58$ | $s_5$ variable | | |
| $R_6 = +326.18$ | $d_6 = 0.57$ | 1.6385 | 55.5 |
| $R_7 = +14.12$ | $s_7 = 2.3$ | | |
| $R_8 = 32.26$ | $d_8 = 0.57$ | 1.6935 | 53.4 |
| $R_9 = +7.8$ | $d_9 = 3.8$ | 1.6727 | 32.2 |
| $R_{10} = +543.87$ | $s_{10}$ variable | | |
| $R_{11} = -95.02$ | $d_{11} = 1.0$ | 1.7847 | 25.7 |
| $R_{12} = +95.02$ | $s_{12}$ variable | | |
| $R_{13} = +66.83$ | $d_{13} = 1.7$ | 1.6935 | 53.4 |
| $R_{14} = -28.87$ | $s_{14} = 1.5$ | | |
| $R_{15} = \infty$ | $d_{15} = 8.5$ | 1.6200 | 36.3 |
| $R_{16} = \infty$ | $s_{16} = 3.0$ | | |
| $R_{17} = +11.92$ | $d_{17} = 2.4$ | 1.7440 | 44.9 |
| $R_{18} = \infty$ | $s_{18} = 3.4$ | | |
| $R_{19} = -10.1$ | $d_{19} = 0.8$ | 1.7847 | 25.7 |
| $R_{20} = +13.93$ | $s_{20} = 1.8$ | | |
| $R_{21} = +60.56$ | $d_{21} = 2.4$ | 1.7200 | 50.3 |
| $R_{22} = -9.43$ | $s_{22} = 0.12$ | | |
| $R_{23} = +24.22$ | $d_{23} = 1.5$ | 1.6935 | 53.4 |
| $R_{24} = -197.77$ | | | |

| $s_5$ | $s_{10}$ | $s_{12}$ | F |
|---|---|---|---|
| 2.30 | 23.94 | 1.2 | 7.5 |
| 16.30 | 6.39 | 4.75 | 16.6 |
| 23.30 | 2.94 | 1.2 | 30.0 |

TABLE II

| Radius | Thickness or Air Separation | Refractive Index, $n_d$ | Abbé Number, $\nu$ |
| --- | --- | --- | --- |
| $R_1 = +145.06$ | $d_1 = 1.2$ | 1.6990 | 30.1 |
| $R_2 = +45.26$ | $d_2 = 6.4$ | 1.6073 | 59.5 |
| $R_3 = -1190.0$ | $s_3 = 0.1$ | | |
| $R_4 = +48.2$ | $d_4 = 3.8$ | 1.6204 | 60.8 |
| $R_5 = +168.83$ | $s_5$ variable | | |
| $R_6 = +601.65$ | $d_6 = 0.72$ | 1.6935 | 53.4 |
| $R_7 = +25.01$ | $s_7 = 2.66$ | | |
| $R_8 = -57.6$ | $d_8 = 0.72$ | 1.6935 | 53.4 |
| $R_9 = +13.32$ | $d_9 = 4.8$ | 1.6727 | 32.2 |
| $R_{10} = +1549.4$ | $s_{10}$ variable | | |
| $R_{11} = +307.34$ | $d_{11} = 1.0$ | 1.6385 | 55.5 |
| $R_{12} = +57.73$ | $s_{12}$ variable | | |
| $R_{13} = +62.43$ | $d_{13} = 1.0$ | 1.6385 | 55.5 |
| $R_{14} = -62.43$ | $s_{14} = 3.0$ | | |
| $R_{15} = \infty$ | $d_{15} = 10.0$ | 1.6385 | 55.5 |
| $R_{16} = \infty$ | $s_{16} = 3.0$ | | |
| $R_{17} = +12.67$ | $d_{17} = 2.58$ | 1.7440 | 44.9 |
| $R_{18} = \infty$ | $s_{18} = 3.61$ | | |
| $R_{19} = -10.73$ | $d_{19} = 0.9$ | 1.7847 | 25.7 |
| $R_{20} = +14.81$ | $s_{20} = 1.93$ | | |
| $R_{21} = +64.39$ | $d_{21} = 2.58$ | 1.7200 | 50.3 |
| $R_{22} = -10.03$ | $s_{22} = 0.13$ | | |
| $R_{23} = +25.76$ | $d_{23} = 1.55$ | 1.6968 | 55.6 |
| $R_{24} = -214.84$ | | | |

| $s_5$ | $s_{10}$ | $s_{12}$ | F |
| --- | --- | --- | --- |
| 2.42 | 40.73 | 1.38 | 8.0 |
| 26.42 | 9.79 | 8.22 | 17.7 |
| 38.42 | 4.73 | 1.33 | 32.0 |

The examples shown in Tables I and II each have a ratio of variation in magnification, i.e., a ratio of maximum to minimum focal length of the objective, of 4 and a relative aperture of $f/1.7$. The rear focal distance is 11.661 mm. in Example I and 12.428 mm. in Example II. The focal length of the relaying member is 16 mm. in Example I and 17 mm. in Example II.

The semi-angular field varies from 22°23′30″ at the minimum focal length $F_{min.} = 7.5$ mm. to 5°42′38″ at the maximum focal length $F_{max.} = 30$ mm. for Example I and it varies from 20°33′21″ at the minimum focal length $F_{min.} = 8$ mm. to 5°21′21″ at the maximum focal length $F_{max.} = 32$ mm. for Example II.

Figure 3A:
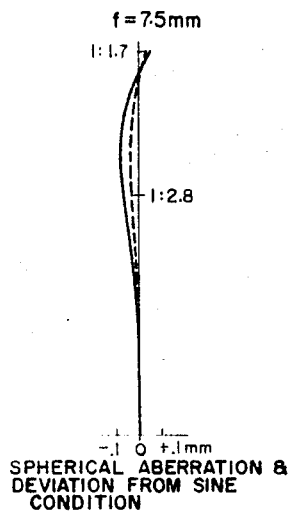
FIGS. 3a–3c are curves illustrating the spherical aberrations (solid line) and deviations from the sine condition (dotted line) at a minimum, an intermediate and a maximum value of the focal length of the lens system.
Figure 3B:
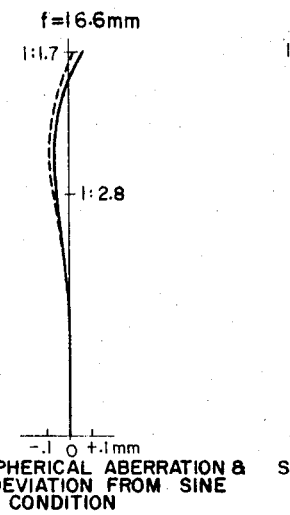
Figure 3C:
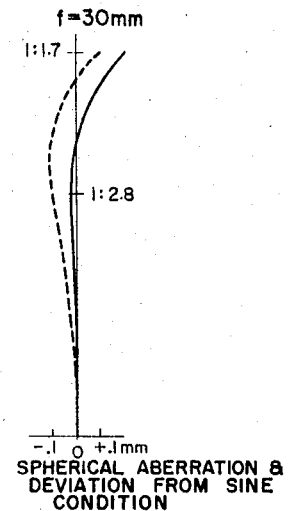
Figure 3D:
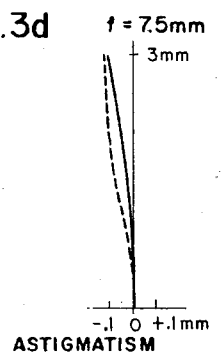
FIGS. 3d–3f are curves illustrating astigmatisms (sagittal ones are designated by solid lines and meridian ones are designated by dotted lines) for 3 focal lengths.
Figure 3E:
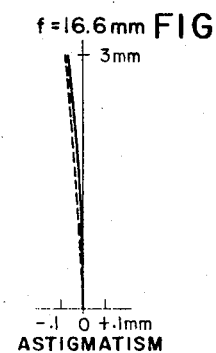
Figure 3F:
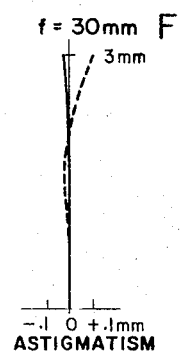
Figure 3G:
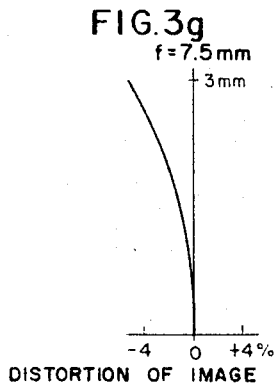
FIGS. 3g–3i are curves illustrating distortions of image for the three focal lengths.
Figure 3H:
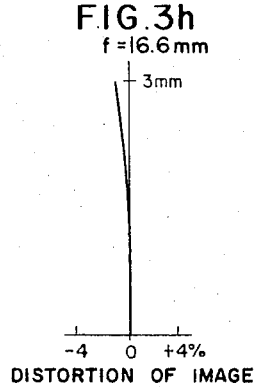
Figure 3I:
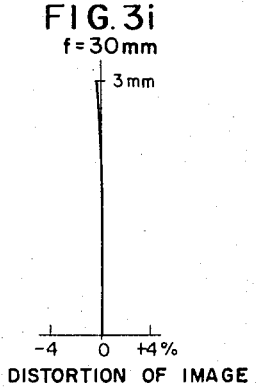

The photographic objectives according to the invention are well-corrected for spherical and chromatic aberration, coma, astigmatism and distortion throughout the range of variation in focal length thereof. For instance Example I or that shown in Table I was corrected for such Seidel's aberrations as shown in FIGS. 3a–3c and 4a–4i. In FIGS. 3a–3c the solid line represents a curve for spherical aberration while the dotted line designates a deviation from the sine condition. In FIGS. 3d–3f the curves represent correction of astigmatism for d-line of the spectrum with solid and dotted lines corresponding to the meridian and sagittal astigmatisms. FIGS. 3g–3i show curves for the correction of distortion for d-line of the spectrum. In these FIGS. 3a, 3d and 3g the curves were obtained at the minimum focal length (or $F = 7.5$ mm.) of the complete objective, in FIGS. 3b, 3c and 3h the curves were obtained at an intermediate value (or $F = 16.6$ mm.) thereof and in FIGS. 3c, 3f and 3i they were obtained at the maximum value (or $F = 30.0$ mm.) thereof.

FIGS. 4a–4i illustrates the relationship between chromatic aberration and ratio of maximum to minimum focal length of the objective in terms of the meridian comas for d- and g-lines of the spectrum. As in FIGS. 3a–3i, the respective curves in FIGS. 4a, 4d and 4g, FIGS. 4b, 4e and 4h, and FIGS. 4c, 4f and 4i correspond to the minimum, intermediate and maximum values of the focal length of the objective equal to those in FIGS. 3a–3i respectively. Curves in FIGS. 4a–4c illustrate the state of imaged focussed with the respective focal lengths for the maximum value of the angular field, those in FIGS. 4d–4g the state of images focussed for 60% of the maximum angular field and in FIGS. 4g–4i the state of image due to the axial ray of light.

FIGS. 5a–5f illustrate the response function of Example I which serves to collectively estimate the extent to which various aberrations have been corrected. FIGS. 5a and 5d, 5b and f and 5c and 5g correspond to the minimum, intermediate and maximum values of the focal length of the objective equal to those in FIGS. 3a–3i and 4a–4i respectively. FIGS. 5a–5c correspond to the axial ray of light and the FIGS. 5d–5f to 70% of the maximum angular field. Solid curves were obtained when the relative aperture of the objective was the maximum or a value of $f/1.7$ and dotted curves obtained when the same had a value of $f/5.6$. Also curves designated at the reference character R correspond to curves for the sagittal astigmatism shown in FIGS. 3a–3i and those designated at the reference character T corresponds to curves for the meridian astigmatism also shown in FIGS. 3a–3i.

While the invention has been described in terms of a ratio of variation of 4 the same is equally applicable to photographic objectives having the ratio of variation of 5 or 6.

What we claim is:

1. A lens system of the continuous zoom type comprising a plurality of lens members lying along the optical axis of the system, in the recited order, the lens members being a front lens member A having a positive dioptric power and composed of a cemented doublet component composed of two elements and having a positive dioptric power and a single meniscus element disposed adjacent the doublet component having a convex surface facing toward an object to be photographed; a movable lens member B having a negative dioptric power and composed of a single element having a negative dioptric power and a cemented doublet component composed of two elements and disposed adjacent the single element and having a negative dioptric power; a movable lens member C composed of a single element having a negative dioptric power; a stationary lens member D composed of a single stationary element having a positive dioptric power to effect correction for spherical aberrations and astigmatism, said lens members A, B, C and D constituting an afocal portion of said lens system; and a stationary relay lens member E to provide the power to focus the collimated light coming from the afocal portion; and wherein the lens member B is movable rectilinearly in one direction along the optical axis of the lens system while at the same time the lens member C is movable first toward the object and then back to its original position for varying the magnification of the lens system, the afocal portion of the lens system having the individual properties as follows:

| | | | | | |
|---|---|---|---|---|---|
| A | $L_1$ | $R_1 = +90.30$ | $d_1 = 1.0$ | $n_1 = 1.6990$ | $\nu_1 = 30.1$ |
| | | $R_2 = +28.76$ | $d_2 = 5.9$ | $n_2 = 1.6073$ | $\nu_2 = 59.5$ |
| | $L_2$ | $R_3 = -762.36$ | $s_3 = 0.1$ | | |
| | | $R_4 = +30.68$ | $d_4 = 4.1$ | $n_3 = 1.6204$ | $\nu_3 = 60.3$ |
| | $L_3$ | $R_5 = +112.58$ | $s_5$ variable | | |
| B | $L_4$ | $R_6 = +326.18$ | $d_6 = 0.57$ | $n_4 = 1.6385$ | $\nu_4 = 55.5$ |
| | | $R_7 = +14.12$ | $s_7 = 2.3$ | | |
| | $L_5$ | $R_8 = 32.26$ | $d_8 = 0.57$ | $n_5 = 1.6935$ | $\nu_5 = 53.4$ |
| | | $R_9 = +7.8$ | $d_9 = 3.8$ | $n_6 = 1.6727$ | $\nu_6 = 32.2$ |
| | $L_6$ | $R_{10} = +543.87$ | $s_{10}$ variable | | |
| C | $L_7$ | $R_{11} = -95.02$ | $d_{11} = 1.0$ | $n_7 = 1.7847$ | $\nu_7 = 25.7$ |
| | | $R_{12} = +95.02$ | $s_{12}$ variable | | |
| D | $L_8$ | $R_{13} = +66.83$ | $d_{13} = 1.7$ | $n_8 = 1.6935$ | $\nu_8 = 53.4$ |
| | | $R_{14} = -28.87$ | | | | wherein L designates the lens elements with the subscripts numbered from front to rear, R is the radius of curvature of the faces of the lens elements with the subscripts numbered from front to rear, $d$ is the axial thickness of each lens element and $s$ the air space between elements, the subscripts numbered from front to rear, $n$ is the index of refraction for the d-line of the spectrum of the lens elements and $\nu$ is the Abbé number of the lens elements, the subscripts being numbered from front to rear and corresponding to the lens element subscripts.

2. A lens system as claimed in claim 1, wherein the air spaces set forth as variable in the table are of following values for the following focal lengths:

| Focal Length | 30 mm | 16.6 mm | 7.5 mm |
|---|---|---|---|
| $s_5$ | 23.30 mm | 16.30 mm | 2.30 mm |
| $s_{10}$ | 2.94 mm | 6.39 mm | 23.94 mm |
| $s_{12}$ | 1.2 mm | 4.75 mm | 1.2 mm |

3. A lens system as claimed in claim 1, wherein the lens system has a minimum focal length of 7.5 mm., a maximum focal length of 30 mm., a ratio of maximum to minimum focal length of 4 and a relative aperture of 1:1.7 and wherein the lens system has a prism P between lens elements D and E and further has the following individual properties:

| | | | | | |
|---|---|---|---|---|---|
| E | P | $R_{15} = \infty$ | $s_{14} = 1.5$ | | |
| | | $R_{16} = \infty$ | $d_{15} = 8.5$ | $n_9 = 1.6200$ | $\nu_9 = 36.3$ |
| | | | $s_{16} = 3.0$ | | |
| | $L_9$ | $R_{17} = +11.92$ | $d_{17} = 2.4$ | $n_{10} = 1.7440$ | $\nu_{10} = 44.9$ |
| | | $R_{18} = \infty$ | $s_{18} = 3.4$ | | |
| | $L_{10}$ | $R_{19} = -10.1$ | $d_{19} = 0.8$ | $n_{11} = 1.847$ | $\nu_{11} = 25.7$ |
| | | $R_{20} = +13.93$ | $s_{20} = 1.8$ | | |
| | $L_{11}$ | $R_{21} = +60.56$ | $d_{21} = 2.4$ | $n_{12} = 1.7200$ | $\nu_{12} = 50.3$ |
| | | $R_{22} = -9.43$ | $s_{22} = 0.12$ | | |
| | $L_{12}$ | $R_{23} = +24.22$ | $d_{23} = 1.5$ | $n_{13} = 1.6935$ | $\nu_{13} = 53.4$ |
| | | $R_{24} = -197.77$ | | | | wherein P designates the prisms, wherein L designates the lens elements with the subscripts numbered from front to rear, R is the radius of curvature of the faces of the lens elements and the portion with the subscripts numbered from front to rear, $d$ is the axial thickness of each lens element and prism and $s$ the air space between elements, the subscripts numbered from front to rear, $n$ is the index of refraction for the d-line of the spectrum of the lens elements and the prism and $\nu$ is the Abbé number of the lens elements and the prism, the subscripts being numbered from front to rear and corresponding to the lens element subscripts.

References Cited
UNITED STATES PATENTS 2,847,907    8/1958    Angenieux ------------ 88—57
3,027,805    4/1962    Yamaji --------------- 88—57

DAVID H. RUBIN, *Primary Examiner.*

JEWELL H. PEDERSEN, *Examiner.*

R. J. STERN, *Assistant Examiner.*